(12) United States Patent
Diamond et al.

(10) Patent No.: US 12,115,880 B2
(45) Date of Patent: Oct. 15, 2024

(54) BATTERY ELECTRIC VEHICLE MONITORING SYSTEMS AND METHODS FOR TRACK USAGE AND OFF-ROADING

(71) Applicant: Ford Global Technologies, LLC, Dearborn, MI (US)

(72) Inventors: Brendan Diamond, Gross Point, MI (US); Jim Stevens, Belleville, MI (US); Keith Weston, Canton, MI (US); Andrew Denis Lewandowski, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 17/529,137

(22) Filed: Nov. 17, 2021

(65) Prior Publication Data

US 2023/0150394 A1 May 18, 2023

(51) Int. Cl.
*B60L 58/12* (2019.01)
*G01C 21/00* (2006.01)
(Continued)

(52) U.S. Cl.
CPC .......... *B60L 58/12* (2019.02); *G01C 21/3469* (2013.01); *G01C 21/3889* (2020.08);
(Continued)

(58) Field of Classification Search
CPC ............... B60L 58/12; B60L 2240/545; B60L 2240/622; B60L 2240/70; B60L 2250/16;
(Continued)

(56) References Cited

U.S. PATENT DOCUMENTS 5,487,002 A * 1/1996 Diller .................... B60L 1/003
701/1
9,024,744 B2 5/2015 Klose et al.
(Continued)

OTHER PUBLICATIONS

Asus, Zaibab, "Dynamic Modeling and Driving Cycle Prediction for a Racing Series Hybrid Car", 2014, IEEE Journal of Emerging and Selected Topics in Power Electronics (Year: 2014).*

(Continued)

*Primary Examiner* — Vivek D Koppikar
*Assistant Examiner* — Godfrey Aleksander Maciorowski
(74) *Attorney, Agent, or Firm* — Joseph Zane; Eversheds Sutherland (US) LLP

(57) ABSTRACT

The disclosure is generally directed to systems and methods for adaptive prediction of electrified vehicle performance including receiving a set of goal parameters identifying a drivers performance requirements, receiving a set of fixed parameters related to course, vehicle and passenger status, receiving past energy consumption data for the electrified vehicle and the driver, generating an adaptive prediction of a future state of charge (SOC) of one or more electricity sources, and providing a dynamic control alteration based on the adaptive prediction, the dynamic control alteration as a function of the set of goal parameters. The adaptive prediction is based on the set of goal parameters, the set of fixed parameters and the past energy consumption data. The adaptive prediction includes updated parameters based on performance of the electrified vehicle.

18 Claims, 4 Drawing Sheets

(51) Int. Cl.
*G01C 21/34* (2006.01)
*G07C 5/08* (2006.01)
(52) U.S. Cl.
CPC ...... *G07C 5/0816* (2013.01); *B60L 2240/545* (2013.01); *B60L 2240/622* (2013.01)
(58) Field of Classification Search
CPC .. B60L 2260/52; B60L 2260/54; B60L 58/14; G01C 21/3469; G01C 21/3889; G07C 5/0816
See application file for complete search history.

(56) References Cited

U.S. PATENT DOCUMENTS

| | | | |
|---|---|---|---|
| 10,415,986 B2 | 9/2019 | Meyer et al. | |
| 2012/0109413 A1* | 5/2012 | Smith | B60W 40/10 701/1 |
| 2018/0162356 A1* | 6/2018 | Colavincenzo | B60W 10/08 |
| 2018/0215281 A1* | 8/2018 | Basler | B60W 10/26 |
| 2018/0257666 A1* | 9/2018 | Bryan | B60L 15/2045 |

OTHER PUBLICATIONS

Bharatiraja Chokkalingam et al., Real-Time Forecasting of EV Charging Station Scheduling for Smart Energy Systems, Energies 2017, 10, 377, 1-16.

Sang Chon et al., Intelligent Battery Management and Charging for Electric Vehicles, Texas Instruments Incorporated, 2017, 1-8.

Emmanouil D. Kostopoulos et al., Real-World Study for Optimal Charging of Electric Vehicles, Elservies, Energy Reports 6 (2020), 418-426.

* cited by examiner

BATTERY ELECTRIC VEHICLE MONITORING SYSTEMS AND METHODS FOR TRACK USAGE AND OFF-ROADING

FIELD OF THE DISCLOSURE

This disclosure generally relates to vehicles, and more particularly relates to systems and methods for battery electric vehicle monitoring.

BACKGROUND

With battery electric vehicles including electrified vehicles relying on battery power and hybrid vehicles that include traditional fuel based systems are entering into the mainstream vehicle portfolio of nearly every automotive company, and performance oriented on-road and off-road electrified vehicles are becoming more common. Although electrified vehicles perform well in off-road environments, vehicle range is critical because the ability to charge may be limited in remote areas.

Similarly, in racing environments, vehicle range becomes critical for drivers to complete a predetermined number of laps. Performance driving and racing environments require adequate charge time for a driver to enjoy driving.

It is desirable to provide solutions that address performance issues for electrified vehicles.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
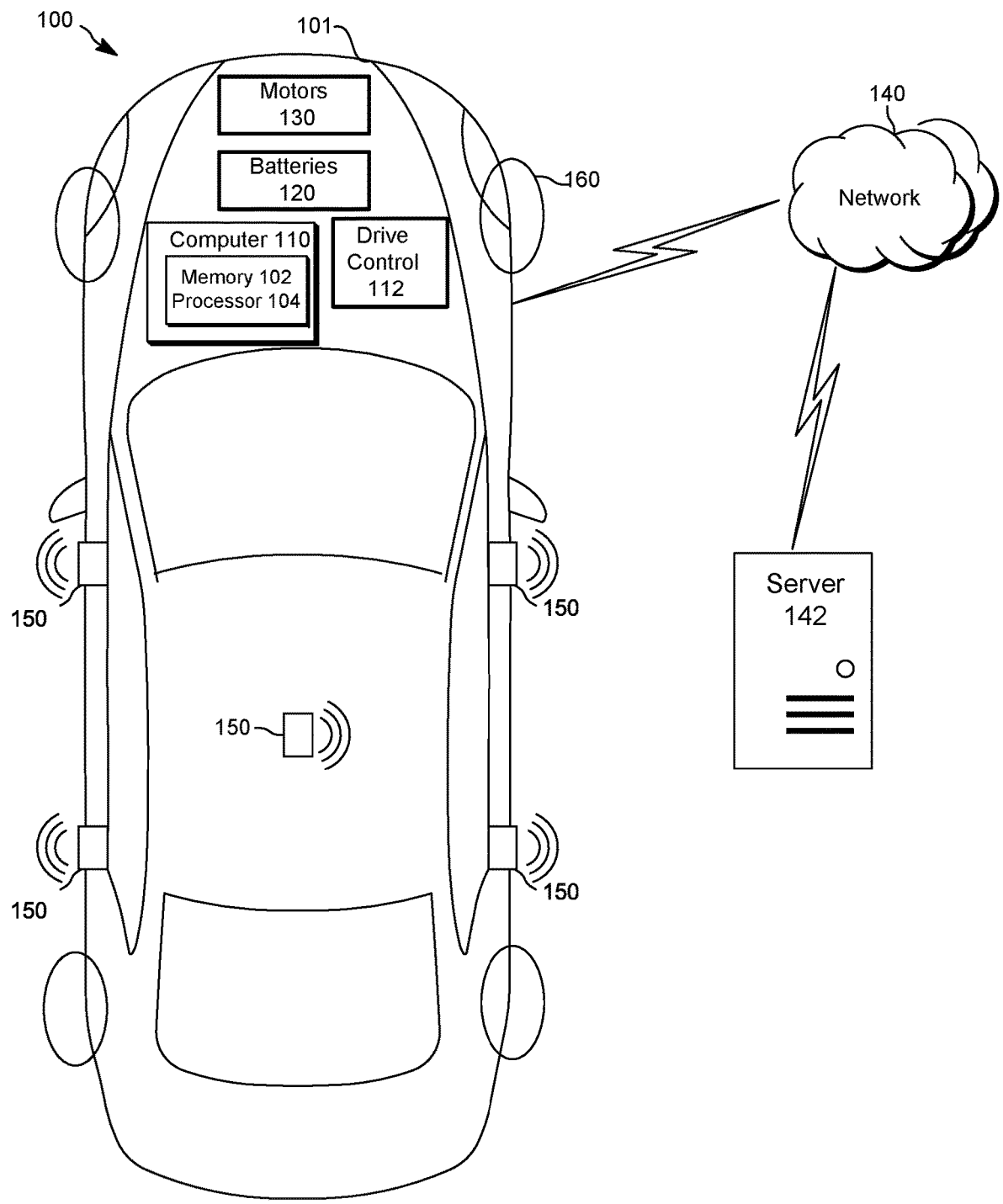
FIG. 1 illustrates an example electrified vehicle in accordance with an embodiment of the disclosure.

In terms of a general overview, this disclosure is generally directed to systems and methods for battery electric vehicle automated lap, range, and charge monitoring for track usage and off-roading. More specifically, this disclosure is related to providing electrified vehicle monitoring for on and off road performance driving and racing, and recreational off-road driving. Such metrics include vehicle range, number of laps remaining, and adequate charge time for a specific number of laps, terrain types. Further metrics include tracking of component thermal behavior from vehicle batteries, and motors that could cause thermal-based derating. Additional metrics monitoring of a distance to a nearest battery charger, distance to home, distance to an off-road track entrance, and the like. Track days are inherently limited due to many constraints including monetary constraints, time constraints, batteries in an electrified vehicle, charging options and locations, charging time required for electric vehicle batteries, thermal limitations of various components in an electrified vehicle charging and propulsion system, and distance from the home location of the electrified vehicle.

For example, some tracks have few chargers at or near a racing track and charging time can be over 20 hour for less than an hour of racing. Further the distance from a driver's home location can often be over 100 miles. There are also thermal limitations of the various components in the charging and propulsion system.

In one or more embodiments, a method for adaptive prediction of electrified vehicle performance may include receiving a set of goal parameters identifying a drivers performance requirements, receiving a set of fixed parameters related to course (for example, length, number of turns, number and length of straightaways, elevation changes, grades associated with the elevation changes, terrain, etc.), vehicle and passenger status, receiving past energy consumption data for the electrified vehicle and the driver, generating an adaptive prediction of a future state of charge (SOC) of one or more electricity sources, and providing a dynamic control alteration based on the adaptive prediction, the dynamic control alteration as a function of the set of goal parameters. The adaptive prediction is based on the set of goal parameters, the set of fixed parameters and the past energy consumption data. The adaptive prediction includes updated parameters based on performance of the electrified vehicle. The dynamic control alteration may be based on the adaptive prediction and is a function of the set of goal parameters.

In one or more embodiments, the receiving of the set of goal parameters identifying a drivers performance requirements may include receiving a minimum range for of the electrified vehicle at completion of the electrified vehicle performance, receiving a route and/or a number of laps to be completed for a predetermined charge sequence, and receiving a map identifying the electrified vehicle performance, the map including entrances and exits.

In one or more embodiments, the receiving of a set of fixed parameters related to vehicle and passenger status may include receiving a weight associated with one or more electrified vehicle passengers, receiving a weight of the electrified vehicle, receiving one or more specifications of one or more batteries in the electrified vehicle, receiving one or more specifications for a motor of the electrified vehicle, and receiving one or more characteristics related tires of the electrified vehicle.

In one or more embodiments, the receiving of past energy consumption data for the electrified vehicle and the driver may include receiving one or more initial energy consumption estimates one or more prior electrified vehicle performances based on one or more of vehicle to vehicle communicated data and vehicle to infrastructure communicated data, and global positioning system (GPS) collected data.

In one or more embodiments, the one or more prior electrified vehicle performances may include one or more of racing laps, test laps, and off-road performances.

In one or more embodiments, the generating of the adaptive prediction of the future SOC of the electricity sources based on the set of goal parameters, the set of fixed parameters and the past energy consumption data, the adaptive prediction including updated parameters based on performance of the electrified vehicle may include monitoring a state of the one or more electrified vehicle batteries, timing a discharge of the one or more electrified vehicle batteries, monitoring a position of the electrified vehicle relative to one or more maps, and providing an adaptive prediction of depletion as modified by the monitored position and the monitored state of the one or more electrified vehicle batteries.

In one or more embodiments the receiving of past energy consumption data for the electrified vehicle and the driver may include receiving one or more initial energy consumption estimates one or more prior electrified vehicle performances.

In one or more embodiments, the generating of the adaptive prediction of the future SOC of the electricity sources based on the set of goal parameters, the set of fixed parameters and the past energy consumption data, the adaptive prediction including updated parameters based on performance of the electrified vehicle may further include predicting a derating of the electrified vehicle, providing an adaptive control efficiency alteration to reduce an energy consumption of the electrified vehicle including one or more of an efficient trajectory, a reduction in a number of motors, and/or predicting an efficiency based on regenerative energy sources.

In one or more embodiments, the method may also include recommending an alteration in course based on the adaptive prediction, the recommendation including one or more of a choice of charging location based on the set of goal parameters, a route alteration to preserve a reserve SOC for return to a charging location.

In one or more embodiments, the method may include recommending a preliminary derating based on one or more of route characteristics, consumption efficiency, battery temperature and the set of goal parameters.

In another embodiment, an electrified vehicle with adaptive prediction of electrified vehicle performance may include one or more batteries, one or more motors coupled to receive energy from the batteries, a plurality of wheels coupled to the one or more motors, a processor coupled to provide instructions for charging and discharging the one or more batteries, a memory that stores instructions coupled to the processor. The processor executes the instructions to receive a set of goal parameters identifying a drivers performance requirements, receive a set of fixed parameters related to vehicle and passenger status, receive past energy consumption data for the electrified vehicle and the driver, and generate an adaptive prediction of a future state of charge (SOC) of one or more electricity sources based on the set of goal parameters, the set of fixed parameters and the past energy consumption data, the adaptive prediction including updated parameters based on performance of the electrified vehicle.

In one or more embodiments, the processor may receive the set of goal parameters identifying a drivers performance requirements including a minimum range for of the electrified vehicle at completion of the electrified vehicle performance, a route and/or a number of laps to be completed for a predetermined charge sequence, and a map identifying the electrified vehicle performance, the map including entrances and exits.

In one or more embodiments, the processor may receive the set of fixed parameters related to vehicle and passenger status including one or more of a weight associated with one or more electrified vehicle passengers, a weight of the electrified vehicle, specifications of one or more batteries in the electrified vehicle, specifications for a motor of the electrified vehicle, and one or more characteristics of tires of the electrified vehicle.

In one or more embodiments, the past energy consumption data for the electrified vehicle and the driver may include initial energy consumption estimates of one or more prior electrified vehicle performances based on one or more of vehicle to vehicle communicated data and vehicle to infrastructure communicated data, and global positioning system (GPS) collected data.

In one or more embodiments, the one or more prior electrified vehicle performances may include one or more of racing laps, test laps, and off-road performances.

In one or more embodiments, the adaptive prediction of the future SOC of the electricity sources may include a display of one or more of a state of the one or more electrified vehicle batteries, a timer illustrating a discharge of the one or more electrified vehicle batteries, a position of the electrified vehicle relative to one or more maps, and an adaptive prediction of depletion as modified by the monitored position and the monitored state of the one or more electrified vehicle batteries.

In one or more embodiments, the adaptive prediction of the future SOC of the electricity sources may include recommending an adaptive control efficiency alteration to reduce an energy consumption of the electrified vehicle including one or more of an efficient trajectory, a reduction in a number of motors, an efficiency based on capacity of regenerative energy sources, and a preliminary de-rating calculation.

In one or more embodiments, the electrified vehicle may include a display configured to provide a recommended alteration in course based on the adaptive prediction, the recommendation including one or more of a choice of charging location based on the set of goal parameters, a route alteration to preserve a reserve SOC for return to the choice of charging location.

In one or more embodiments, the display may be further configured to provide a recommendation for a preliminary derating based on one or more of route characteristics, consumption efficiency, battery temperature and the set of goal parameters.

Another embodiment is directed to a system for adaptive prediction of electrified vehicle performance, including a memory that stores computer-executable instructions, and a processor configured to access the memory and execute the computer-executable instructions to: receive a set of goal parameters identifying a drivers performance requirements, receive a set of fixed parameters related to vehicle and passenger status, receive past energy consumption data for the electrified vehicle and the driver, and generate an adaptive prediction of a future state of charge (SOC) of one or more electricity sources based on the set of goal parameters, the set of fixed parameters and the past energy consumption data, the adaptive prediction including updated parameters based on performance of the electrified vehicle.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternative implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

It should also be understood that the word "example" as used herein is intended to be non-exclusionary and non-limiting in nature. Furthermore, certain words and phrases that are used herein should be interpreted as referring to various objects and actions that are generally understood in various forms and equivalencies by persons of ordinary skill in the art. For example, the word "application" or the phrase "software application" as used herein with respect to a nomadic device such as a smartphone, refers to code (software code, typically) that is installed in the nomadic device. The code may be launched and operated via a human machine interface (HMI) such as a touchscreen. The word "action" may be used interchangeably with words such as "operation" and "maneuver" in the disclosure. The word "maneuvering" may be used interchangeably with the word "controlling" in some instances. The word "vehicle" as used in this disclosure can pertain to any one of various types of vehicles such as cars, vans, sports utility vehicles, trucks, electrified vehicles, gasoline vehicles, hybrid vehicles, and autonomous vehicles. Phrases such as "automated vehicle," "autonomous vehicle," and "partially-autonomous vehicle" as used in this disclosure generally refer to a vehicle that can perform at least some operations without a driver being seated in the vehicle.

FIG. 1 illustrates an example system 100 that includes an electrified vehicle 101 configured with batteries 120 and motors 130 in accordance with an embodiment of the disclosure. The vehicle 101 may be one of various types of vehicles such as a gasoline powered vehicle, an electrified vehicle, a hybrid electrified vehicle, or an autonomous vehicle, that is configured as an automated or semi-automated vehicle. The electrified vehicle 101 may be implemented in a variety of ways and can include some components that are a part of the vehicle 101, and, in some embodiments, other components that are accessible via a communications network 140. The components that can be a part of the vehicle 101 can include an on-board computer 110 with a processor 102 and a memory 104 in communication with the network 140.

The on-board computer 110 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in a blind spot, etc.).

The on-board computer 110, in one or more embodiments, may be used to support features such as passive keyless operations, remotely-controlled vehicle maneuvering operations, and remote vehicle monitoring operations. On-board computer 110, in one or more embodiments, may execute certain operations associated with on-board package sorting in accordance with the disclosure.

The wireless communication system may include a set of wired or wireless communication nodes and/or sensors 150 mounted in several locations surrounding electrified vehicle 101 in a manner that allows the vehicle on-board computer 110. Examples of wireless communication sensors can be capable of reading computer readable identifiers via cameras, laser readers, and the like. In one or more embodiments, sensors 150 may further include one or more of Bluetooth R, or Bluetooth® low energy (BLE) components. Further, in one or more embodiments, sensor data may be enhanced or substituted with cloud-based network data communicated to electrified vehicle 101. Communications to on-board computer 110 can be hard-wired or wireless connected to sensors 150 or may use one or more of various wireless technologies such as Bluetooth®, Ultra-Wideband (UWB), Wi-Fi, ZigBeeR, Li-Fi (light-based communication), audible communication, ultrasonic communication, near-field-communications (NFC), Bluetooth® low energy (BLE) and the like, for carrying out communications.

In one or more embodiments, sensors 150 may include one or more proximity sensors configured and/or programmed to detect the presence, proximity, and/or location of object(s) near the vehicle 101. For example, the proximity sensors may include radar sensor(s), LIDAR sensor(s), ultrasonic sensor(s), cameras, and/or any other sensor configured to detect the presence, proximity, and/or location of nearby object(s), such as obstacles, vehicles, and people and/or animals. A radar sensor detects and locates an object via radio waves, a LIDAR sensor detects and locates the object via lasers, and an ultrasonic sensor detects and locates the object via ultrasound waves. The vehicle 101 may further include one or more camera(s) (not shown in FIG. 1) that may be configured and/or programmed to capture image(s) and/or video of a surrounding area of the vehicle 101 to enable nearby object(s) to be identified and located. Digital processing units can analyze the content of a camera image to detect motion and the presence of people and obstacles. In one example, the sensors 150 are located on each side of the vehicle 101 (e.g., front, rear, left, right) to enable the sensors 150 in monitoring each portion of the surrounding area of the vehicle 101. Additionally, or alternatively, the sensors 150 may be positioned at other location(s) of the vehicle 101 that enable the sensors to monitor the surrounding area.

Vehicle 101 may further include drive control component 112 that may be coupled to computer 110 to provide an input for a battery SOC calculation, and may also be controlled in accordance with embodiments. For example, drive control component 112 may be configured to change the operational characteristics of vehicle 101 including altering the maximum distance and speed that vehicle 101 is capable of reaching. Drive control component 112 may further control drive settings such as whether vehicle 101 is operating in four-wheel drive or two-wheel drive, traction control, throttle response, front and rear locking differential, turn assistance, stabilizing sway bar, one-pedal drive, suspension settings, and the like., and As one of skill in the art will appreciate with the benefit of the present disclosure, one-pedal drive is possible with regenerative braking in many electric vehicles and can beneficially increase the maximum driving range of vehicle 101.

The on-board computer 110, may further connect via the communications network 140. The communications network 140 may include any one network, or a combination of networks, such as a local area network (LAN), a wide area network (WAN), a telephone network, a cellular network, a cable network, a wireless network, and/or private/public networks such as the Internet. For example, the communications network 140 may support communication technologies such as TCP/IP, Bluetooth®, cellular, near-field communication (NFC), Wi-Fi, Wi-Fi direct, Li-Fi, acoustic or ultrasonic audio communication, Bluetooth Ultra-Wideband (UWB), machine-to-machine communication, and/or man-to-machine communication.

FIG. 1 further illustrates server 142 communicatively coupled to network 140. Server 142 may perform remote processing and/or provide data, such as track data, to the vehicle 101. Information communicated over network 1490 or directly can include current vehicle energy/lap consumption, charge time to complete a certain number of laps or number of miles of off-road terrain with respect to a minimum desired range after the high performance drive event is complete. The system inputs can be prefilled based on track information (GPS or input), vehicle information, historical data (e.g. 3 kWh/mile and 40 laps per charge), communicated via vehicle to vehicle communication, vehicle to infrastructure or vehicle to cloud communication from similar vehicles in the same location, or manually inputted. Thus, in one or more embodiments, and by tracking vehicle 101 relative location to a track/course and entering into track mode, over-the-air updates may recalibrate vehicle 101 for a specific track/course or for additional vehicle performance capabilities. In one or more embodiments, over the air updates may recalibrate vehicle 101 for a specific track/course or for additional vehicle performance capabilities such as to allow for higher current/power discharge or charge limits or even expand battery thermal limits such that the battery would not derate or derate less based on reaching a specified temperature threshold. In one or more embodiments, the system may be a subscription service, such that over the air updates occur regularly.

Figure 2:
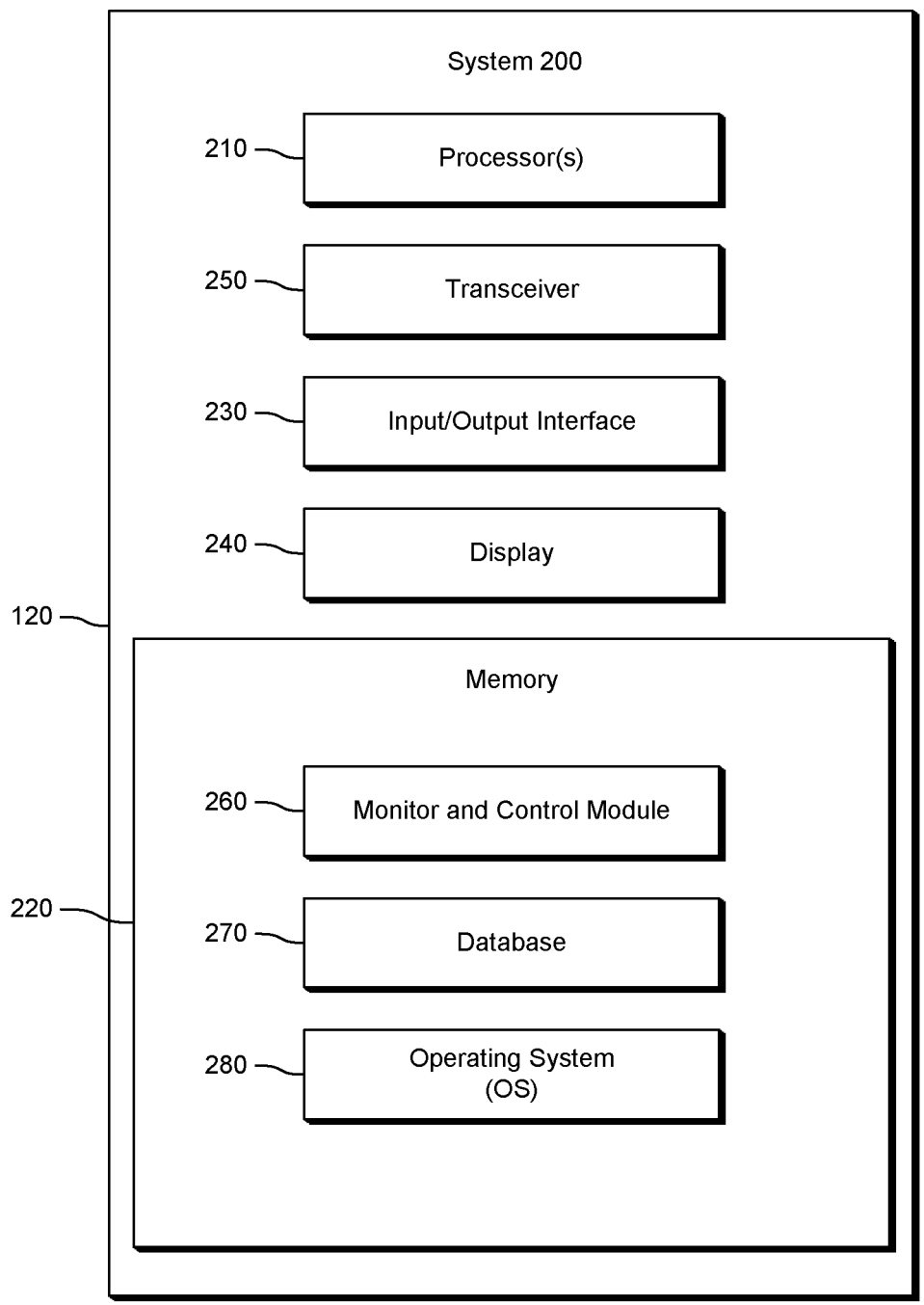
FIG. 2 illustrates a system with some example functional blocks that may be included in on-board computer on the example electrified vehicle or accessed via a network or cloud in accordance with embodiments of the disclosure.

FIG. 2 illustrates system 200 including example functional blocks that may be included in the on-board computer 110, or accessible via network 140 or via server 142 in accordance with an embodiment of the disclosure. The functional blocks of the on-board computer 110 may include a processor 210, memory 220, an input/output (I/O) interface 230, transceiver 250, monitor and control module 260, database 270, and an operating system (OS) 280. The I/O interface 230, may include a display, such as a touchscreen having softkeys (graphical icons), and a biometric component (to enable facial recognition, a fingerprint scanner, or a microphone for voice command input). The operating system 280 can be any of various kinds of software used for operating vehicle such as, for example, an iOSR operating system, an Android R operating system, or a Windows® operating system.

The memory 220, which is one example of a non-transitory computer-readable medium, may be used to store the operating system (OS) 280, database 270, and various modules such as the monitor and control module 260. One or more additional modules functioning as, for example, software applications in the form of computer-executable instructions may be executed by the processor 210 for performing various operations in accordance with the disclosure. More particularly, monitor and control module 260 may be executed by the processor 210 to provide monitoring for the electrified vehicle including automated lap, range, and charge monitoring for courses such as racetracks and off-road courses. Monitor and control module 260 may be coupled to database 270 to provide historical drive data, track data, and the like. Database 270 in combination with monitor and control module 260 may operate to store data from sensors 150 including temperature, moisture, location via GPS, and other data relevant to operation of vehicle 101.

In one or more embodiments, system 200 may operate within vehicle 101, or may operate via network 140. For example, in one embodiment, system 200 or portions of system 200 are accessible over a cloud connection, for example via server 142. Thus, for example, in one embodiment server 142 enables remote processing when server 142 is in communication with vehicle 101 to provide data, track data and the like.

Figure 3:
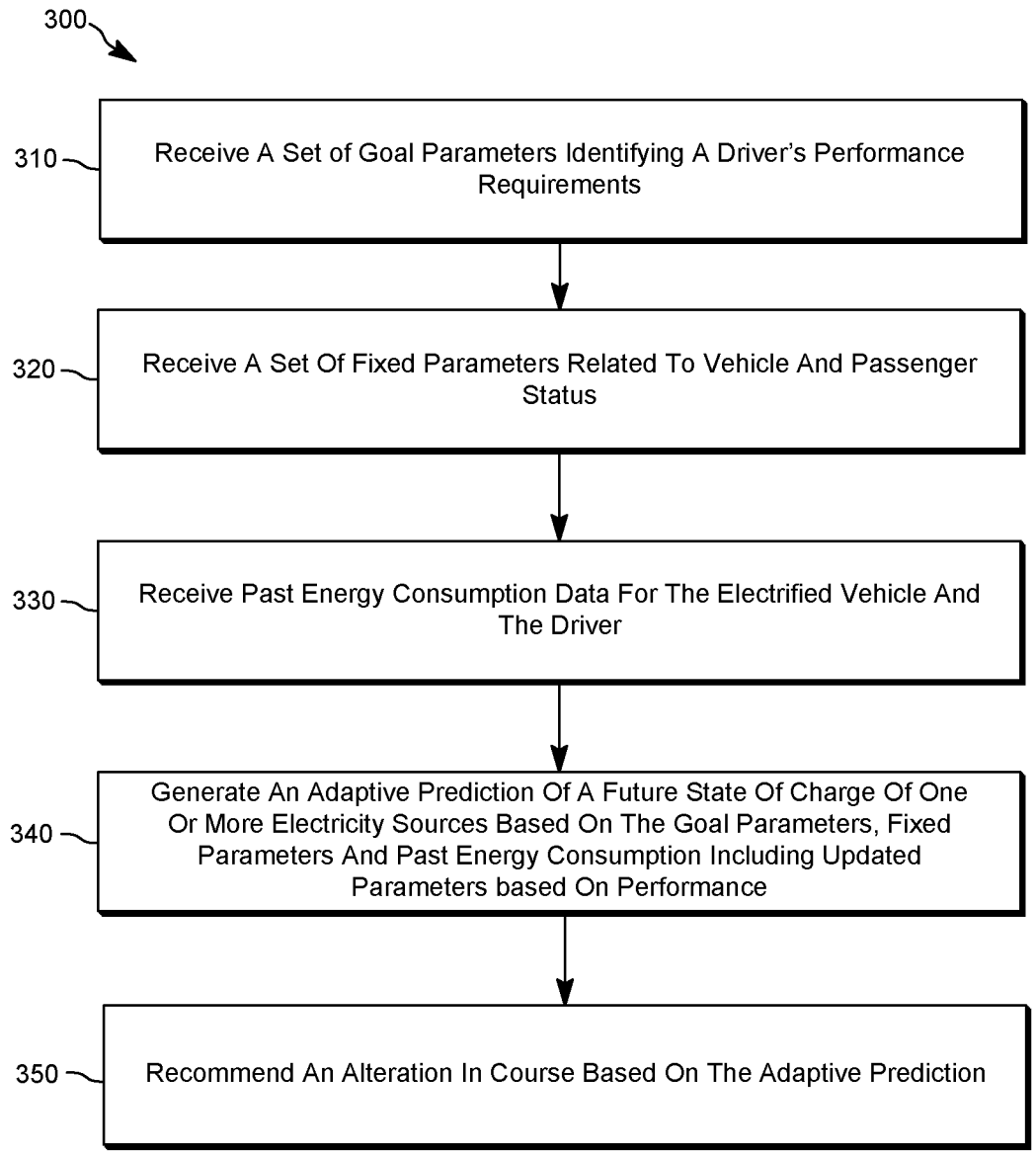
FIG. 3 illustrates a flow diagram of a method in accordance with an embodiment of the disclosure.

FIG. 3 illustrates a flow diagram of a method 300 accordance with one or more embodiments for electrified vehicle monitoring. More specifically, FIG. 3 provides a flow diagram for a method for monitoring as an adaptive prediction of electrified vehicle performance. In one or more embodiments, method 300 is performed by monitor and control module 260, either directly within vehicle 101, remotely over network 140, or via a cloud or server solution via server 142.

Figure 4:
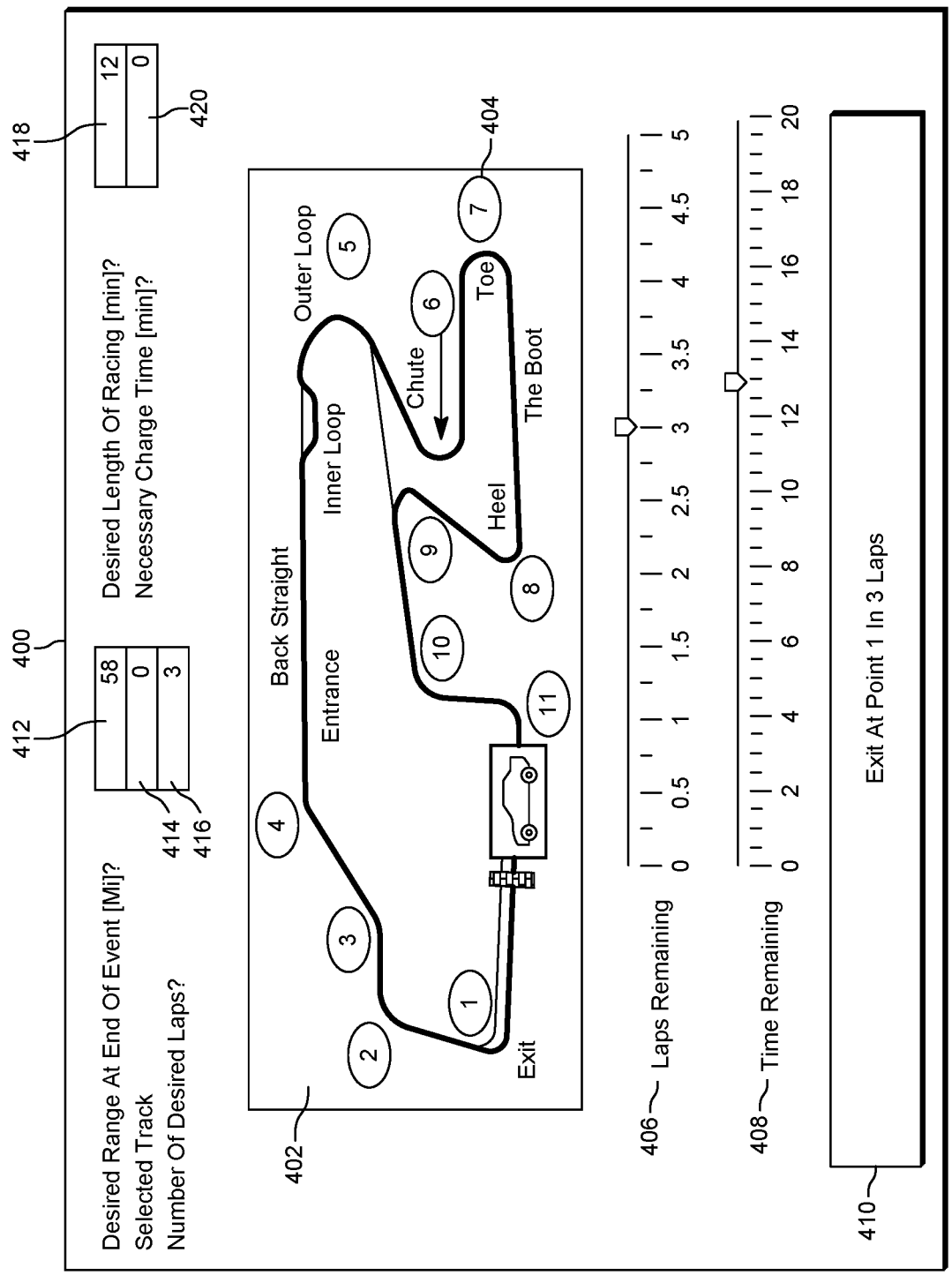
FIG. 4 illustrates a map of a track as a display including exits and entrances and goal parameters in accordance with an embodiment of the disclosure.

FIG. 4 illustrates a display 400 of a course to exemplify one or more embodiments of the present disclosure. The course represented may be either a racetrack or an off-road course with rocks, sand and the like.

Referring to FIG. 3, block 310 provides for receiving a set of goal parameters identifying a driver's performance requirements. For example, referring to FIG. 4, a display 400 of a map 402 with locations 404 allows a driver to provide a set of goal parameters. As shown, display 400 indicates laps remaining 406, and time remaining 408 and an exit point 410. Goal parameters can include desired range at the end of an event 412, a selected track 414, a number of desired laps 416, desired length of racing time 418 and a necessary charge time 420. For an off-road course, the goal parameters can include a state of charge (SOC) at end of trail, torque or requirement for attempting different rock or sand formations on the course or the like. In one or more embodiments, the goal parameters may include receiving a minimum range for of the electrified vehicle 101 at completion of the electrified vehicle performance, receiving a route and/or a number of laps to be completed for a predetermined charge sequence, and receiving a map identifying the electrified vehicle performance at different parts of the track, the map including entrances and exits.

In practice, a user such as a driver of an electrified vehicle 101 can engage track mode for the electrified vehicle and a display such as display 400 may appear within the vehicle, such as through a vehicles entertainment system. In one or more embodiments, the range can include a computation based on the distance to a nearest compatible charger, home charger or a charging station manually inputted by a driver.

As shown, display 400 further includes a vehicle location and a course that will be raced, which could be a race track or an off-road track in some embodiments. For this purpose, software in combination with network abilities can access a database (for example, database 270) and determine a length of single lap of the track or the like. Referring back to FIG. 3, block 320 provides for receiving a set of fixed parameters related to a track or course, the vehicle and passenger status.

For example, fixed parameters may be received from a database (for example, database 270) or over a network 140.

In one or more embodiments, fixed parameters can include passenger weight such as a weight associated with one or more electrified vehicle passenger, a weight of the electrified vehicle, one or more specifications of one or more batteries in the electrified vehicle, and one or more specifications for a motor of the electrified vehicle, and one or more characteristics related to tires of the electrified vehicle. Tire information can include the size of the tires, brand/model, materials, air pressure, and wear characteristics.

FIG. 3 block 330 provides for receiving past energy consumption data for the electrified vehicle and the driver. For example, past energy consumption data can include values regarding energy usage per unit distance, such as a quarter mile, or section of the track or course performed by the vehicle, the driver or both. In one or more embodiments, past energy consumption estimates can include qualifying laps for a racing course, test laps, modeling of a course, which can include either racetrack modeling or off-track modeling and the like. The past energy consumption data may be received locally from database 270 or remotely via the network 140.

In one or more embodiments the goal parameters, fixed parameters and energy consumption data can be entered by the driver via display 400, for example through an vehicle entertainment system of the like.

As shown in FIG. 400, the minimum desired range at the end of the track day can be adaptively predicted based on a goal. Referring to FIG. 3, block 340 provides for generating an adaptive prediction of a future state of charge of one or more electricity sources (for example, batteries 120) based on the goal parameters, fixed parameters and past energy consumption, with the updated parameters based on performance. Thus, after the driver inputs a minimum desired range at the end of a course performance, the system may access a database to provide the location and course that will be driven, a length of the course, and energy usage estimates based on, for example, other like vehicles, past data, and modeled data. The system then generates an adaptive prediction based on the current data received. In one or more embodiments, the adaptive prediction is based on the goal parameters, fixed parameters and past energy consumption data. The adaptive prediction can include the electrified vehicle's current state of charge (SOC) and current energy capacity and consumption and number of miles on the course. In an off-road environment, the adaptive prediction can be based on a geofenced area or the like. In one or more embodiments, the adaptive prediction is constantly being altered or updated based on received data. For example, monitor and control module 260 adaptively predict based on data received from sensors 150 and from data received via network 140. In one or more embodiments, data regarding the course environment, such as weather as related to vehicle performance may be included as a fixed parameter. For example, hot weather can deplete electric vehicle batteries quicker than colder weather. Such data can be stored in database 270 after processing or being received via network 140. Sensors 150 can include sensors that detect directly or over GPS, and received and processed by monitor and control module 260.

In one or more embodiments, the adaptive prediction can include outputs on display 400 that illustrate a charge duration before start of a course. In one or more embodiments, the adaptive prediction can include pre-course activities, such as driving to a course, either off road or racetrack so that the adaptive prediction can determine a distance to the course and required energy required prior to driving a course, based on the predetermined number of laps set as a performance goal.

In one or more embodiments, the adaptive prediction can include intra-course predictions that provide a time until one or more electricity sources are depleted. For example, if the energy sources are batteries, a time associated with the batteries. In one or more embodiments, the energy depletion rate may be used to determine a number of laps until batteries are depleted.

As one of skill in the art will appreciate with the benefit of the present disclosure, depletion rate varies over a course, either a race track or a trail for an off-road vehicle based on the terrain and elevation. For example, a course could have loose dirt, rock, mud or the like, and elevation can impact depletion as well. Even a same course can have different depletions rates because of course conditions, as affected by weather, dirt, mud, and the like.

In other embodiments, the adaptive prediction can include a level of de-rate from thermal, state of charge (SOC) or user-defined limitations. For example, in some courses, such as off road environments, de-rating can occur from sand driving or extreme rock crawling or the like.

In one or more embodiments, the adaptive prediction can enable the display of predictions including a time until the batteries are depleted such as time 408 shown on FIG. 4, and a number of laps remaining 406. Another adaptive prediction can include a current level of de-rating. For example, a driver may choose to de-rate vehicle preemptively to reduce energy consumption to finish current "heat" without recharging. For example, de-rating a vehicle can include changing the maximum acceleration of a vehicle to lower performance and save battery life when there is a risk of being unable to return to a charging station without doing so.

In one or more embodiments, the adaptive prediction can include recommending a preliminary de-rating based on one or more of route characteristics, consumption efficiency, battery temperature and the set of goal parameters. For example, on a racetrack, the adaptive prediction can identify a location of when and where to exit a race or off-road course to avoid a shut down or excessive de-rate on a course. Display 400 can optionally provide outputs related to improvement in driving, or degradation in lap time with respect to a prior stored lap or course trip.

In other embodiments, the adaptive prediction may include predicting a de-rating of the electrified vehicle 101, providing an adaptive efficiency alteration to reduce an energy consumption of the electrified vehicle including one or more of an efficient trajectory, a reduction in a number of motors; and predicting an efficiency based on regenerative energy sources. In some embodiments, an alteration can include changing a maximum acceleration, eliminating one or more drive modes, and/or adjust controls such as throttle response or the like. More specifically, as one of skill in the art will appreciate, certain drives modes require increased energy consumption. Likewise, certain powertrain operational modes reduce efficiency but increase performance. An example would be the torque split ratio on an AWD BEV which is the ratio of front axle to rear axle torque output. This ratio could be controlled to favor efficiency rather than to favor vehicle dynamic control/traction. Additionally, if a driver reduces the maximum acceleration limit, the ability of the vehicle to accelerate to higher speeds reduces and potentially reduce the amount of energy "wasted". A driver may limit the vehicle's top speed to ensure operating close to the most energy efficient vehicle speed of 45-50 miles per hour, for most vehicles. Other modes a driver may choose to disable include energy consuming modes such as "Baja", "Track", "Rock Crawl", or "Sport" that may consume higher energy for a given distance than an economy mode.

In one or more embodiments, the adaptive prediction may update energy usage of an electrified vehicle and include updates that take into account any regenerative sources for battery charging such as regenerative braking. An adaptive prediction can further include taking into account battery discharge data such as aggressive driving and courses that have open stretches, courses with many rocks and the like.

In one or more embodiments, the adaptive prediction includes generating a prediction that takes into account and differentiates between "warm up" laps and actual laps such that appropriate algorithms, weights and rolling averages may accurately represent an electrified vehicle energy usage.

In one or more embodiments, the generating the adaptive prediction may further include monitoring a state of the one or more electrified vehicle batteries, timing a discharge of the one or more electrified vehicle batteries, monitoring a position of the electrified vehicle relative to one or more maps, and providing an adaptive prediction of depletion as modified by the monitored position and the monitored state of the one or more electrified vehicle batteries.

In one or more embodiments, the generating the adaptive prediction of the future SOC of the electricity sources based on the set of goal parameters, the set of fixed parameters and the past energy consumption data, the adaptive prediction including updated parameters based on performance of the electrified vehicle may further include receiving one or more initial energy consumption estimates of one or more prior electrified vehicle performances. For example, a database can be maintained and accessed over network 140 accessible to the electrified vehicle. The initial energy consumption estimates can be received over network 140 or be stored in a database within memory 102 of vehicle 101. In one or more embodiment, server 142 provides such consumption estimates, for example, as a cloud server or other infrastructure type server.

Referring back to FIG. 3, block 350 provides for providing a dynamic control alteration based on the adaptive prediction, the dynamic control alteration as a function of the set of goal parameters. For example, the system may recommend or implement directly the dynamic control alteration including one or more of a choice of charging location based on the set of goal parameters and a route alteration to preserve a reserve SOC for return to a charging location. In one or more embodiments, the dynamic control alteration is a function of the set of goal parameters in that the goal parameters determines the metes and bounds of the control alteration. In other embodiments, the dynamic control alteration can include changing operation characteristics of vehicle 101. For example, if the goal parameters mandate that a certain number of laps take place, the course alteration can include altering a route vehicle 101 takes to a charging station or home after completion of a race or course. In another example, a battery electric vehicle traversing a desert terrain at high speed may receive battery consumption estimation for a planned route based on vehicle to vehicle or vehicle to infrastructure data and the driver's planned driving route. According to embodiments herein, dynamic control alteration adjusts using machine learning according to the driver's driving style and determines if a planned excursion is possible, or recommends a change in driving style or change in route (outbound or return) to account for energy consumption. In one or more embodiments, vehicle 101 actively truncates power as required to maintain battery temperature and power density to ensure that return trip is possible.

In one or more embodiments, the results of a course or race can be recorded for the electrified vehicle 101 location and stored in memory 102, memory 220, database 270 or via network 140 to a cloud location, such as server 142 for example, for future reference. Storing a race or off-road experience can allow recommendations as to a type of charger or a preferable SOC for a particular location. Other data that can be stored includes calculations regarding whether vehicle 101 should locate a more capable charger, reduce overall travel/charge time and the like. For off-road locations, relative energy consumption rates for different locations, such as geofenced locations can be stored to estimate necessary energy needed for maneuvering and the like. For example, gravel vs. low-speed obstacles will require a different energy consumption rate as opposed to rock-crawling. Thus, energy consumption rates can be uploaded to provide initial estimates for a later experience.

In one or more embodiments, such information can include locations of chargers on trails which can be provided to third parties which can in turn provide marketing to drivers in the future. Information can further include chargers that are installed "off-grid" along a trail using renewable energy sources such as solar or wind charging high-capacity battery packs. Such information and availability of the chargers can be integrated into the system to show the driver options and make sure the vehicle 101 can make it home. Such information can be supplied either vehicle to vehicle or from an infrastructure/cloud environment to a vehicle as a subscription-based service, or a shared data service.

Referring back to FIG. 1, in one or more embodiments, vehicle 101 includes one or more batteries 120, one or more motors 130 coupled to receive energy from batteries 120, a plurality of wheels 160 coupled to the one or more motors 130, and a processor 104 coupled to provide instruction for charging and discharging batteries 120, and a memory 102 that stores instructions, the memory coupled to processor 104.

Processor 104 executes instructions to receive a set of goal parameters identifying a drivers performance requirements, receive a set of fixed parameters related to course, vehicle and passenger status, receive past energy consumption data for the electrified vehicle and the driver, generate an adaptive prediction of a future state of charge (SOC) of one or more electricity sources based on the set of goal parameters, the set of fixed parameters and the past energy consumption data, the adaptive prediction including updated parameters based on performance of the electrified vehicle, and provide a dynamic control alteration based on the adaptive prediction, the dynamic control alteration as a function of the set of goal parameters. The dynamic control alteration can include a course alteration, and/or an alteration in controls affecting battery usage as determined by the change in the SOC, and data received by the monitor and control module 260. As a result, dynamic control alteration can affect multiple aspects of an electric vehicle.

Referring to FIG. 4, in one or more embodiments, the electrified vehicle 101 further includes a display 400 of one or more of a state of the one or more electrified vehicle batteries 120: a timer 408 illustrating a discharge of the one or more electrified vehicle batteries 120; a position of the electrified vehicle relative to one or more maps 402; and an adaptive prediction of depletion as modified by the monitored position and the monitored state of the one or more electrified vehicle batteries 418, 420.

In one or more embodiments, the adaptive prediction of a future SOC of the electricity sources includes recommending an adaptive efficiency alteration to reduce an energy consumption of the electrified vehicle including one or more of an efficient trajectory, a reduction in a number of motors: an efficiency based on capacity of regenerative energy sources, and a preliminary de-rating calculation.

In one or more embodiments, electrified vehicle 101 includes a display 400 configured to provide a recommended alteration in course based on the adaptive prediction, the recommendation including one or more of a choice of charging location based on the set of goal parameters and/or a route alteration to preserve a reserve SOC for return to the choice of charging location.

In one or more embodiments, the display 400 provides a recommendation for a preliminary derating based on one or more of route characteristics, consumption efficiency, battery temperature and the set of goal parameters.

One of skill in the art will appreciate that display 400 and the associated adaptive prediction system can also be adapted for off-road environments wherein vehicle 101's current location and distance are tracked relative to an off-road entry location. Thus, based on vehicle 101's SOC, energy consumption rate and distance to a charger, vehicle 101 may be displayed on display 400 via system 200 to provide the driver alerts and notifications regarding when to return to the home location/when to charge vehicle 101. In addition, in some embodiments, system 200 records time averaged energy consumption, for example in database 270, for the vehicle's relative location and sent to the cloud via network 140 for future reference and shared via vehicle to vehicle communication or vehicle to infrastructure communication. If the vehicle 101 intends to return to off-roading, vehicle 101 may, in some embodiments, provide a recommendation which type of charger to use and what SOC to charge to in order to ensure another similar vehicle is capable of off-roading for the user specified amount of time at a user specified location. Thus, relative energy consumption rates for each type of off-road location may be made available to electric vehicles to ensure a proper estimate of necessary energy needed for the desired vehicle maneuvering.

In one or more embodiments, off-road courses can include long trails with chargers installed "off-grid" along the trail using renewable energy sources such as solar or wind charging high-capacity battery packs. Location of such chargers and availability of chargers can be integrated into system 200 to show the driver options and make sure vehicle 101 can make it home or to a desired location.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 102 can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, nomadic devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for adaptive prediction of electrified vehicle performance comprising:

receiving a set of goal parameters identifying a drivers performance requirements for a course, the set of goal parameters comprising a route and a number of laps to be completed for a predetermined charge sequence, wherein the set of goal parameters mandate the number of laps to be completed, and the route comprises a first sub-route to a first charging location after completion of the course;

receiving a set of fixed parameters related to the course, the electrified vehicle and a passenger status;

receiving past energy consumption data for the electrified vehicle and the driver;

generating an adaptive prediction of a future state of charge (SOC) of one or more electricity sources of the electrified vehicle based on the set of goal parameters, the set of fixed parameters and the past energy consumption data, the adaptive prediction including updated control data based on current performance of the electrified vehicle, wherein the generating of the adaptive prediction comprises:

determining a dynamic course alteration that includes altering the route to take a second sub-route to a second charging location after completion of the course, wherein the second sub-route requires a lesser SOC reserve than the first sub-route;

determining, based at least in part on sensor data collected by the electrified vehicle on the course and further based at least in part on the dynamic course alteration, that the current performance of the electrified vehicle is insufficient to meet the set of goal parameters;

in response to having determined that the current performance is insufficient to meet the set of goal parameters, determining a preliminary derating that is sufficient to complete the route and the number of laps, wherein the determining of the preliminary derating is based on one or more of route characteristics, consumption efficiency, battery temperature and the set of goal parameters; and recommending the preliminary derating to the driver; and providing a dynamic control alteration to the electrified vehicle, the dynamic control alteration as a function of the set of goal parameters.

2. The method of claim 1 wherein the receiving the set of goal parameters identifying a drivers performance requirements comprises:

receiving a minimum range for of the electrified vehicle at completion of the electrified vehicle performance; and receiving a map identifying the electrified vehicle performance, the map including entrances and exits.

3. The method of claim 1 wherein the receiving a set of fixed parameters related to vehicle and passenger status further comprises:
receiving a weight associated with one or more electrified vehicle passengers;
receiving a weight of the electrified vehicle;
receiving one or more specifications of one or more batteries in the electrified vehicle;
receiving one or more specifications for a motor of the electrified vehicle; and
receiving one or more characteristics related to tires of the electrified vehicle.

4. The method of claim 1 wherein the receiving past energy consumption data for the electrified vehicle and the driver further comprises:
receiving one or more initial energy consumption estimates one or more prior electrified vehicle performances based on one or more of vehicle to vehicle communicated data and vehicle to infrastructure communicated data, and global positioning system (GPS) collected data.

5. The method of claim 4 wherein the one or more prior electrified vehicle performances includes one or more of racing laps, test laps, and off-road performances.

6. The method of claim 1 wherein the generating the adaptive prediction of the future SOC of the electricity sources based on the set of goal parameters, the set of fixed parameters and the past energy consumption data, the adaptive prediction including updated parameters based on performance of the electrified vehicle further comprises:
monitoring a state of the one or more electrified vehicle batteries;
timing a discharge of the one or more electrified vehicle batteries;
monitoring a position of the electrified vehicle relative to one or more maps; and
providing an adaptive prediction of depletion as modified by the monitored position and the monitored state of the one or more electrified vehicle batteries.

7. The method of claim 1 wherein the generating the adaptive prediction of the future SOC of the electricity sources based on the set of goal parameters, the set of fixed parameters and the past energy consumption data, the adaptive prediction including updated parameters based on performance of the electrified vehicle further comprises:
receiving one or more initial energy consumption estimates of one or more prior electrified vehicle performances.

8. The method of claim 1 wherein the wherein the generating the adaptive prediction of the future SOC of the electricity sources based on the set of goal parameters, the set of fixed parameters and the past energy consumption data, the adaptive prediction including updated parameters based on performance of the electrified vehicle further comprises:
providing an adaptive control efficiency alteration to reduce an energy consumption of the electrified vehicle including one or more of an efficient trajectory, a reduction in a number of motors; and
predicting an efficiency based on regenerative energy sources.

9. The method of claim 1 wherein the providing a dynamic control alteration based on the adaptive prediction, the dynamic control alteration as a function of the set of goal parameters further comprising:
recommending the dynamic control alteration including one or more of a choice of charging location based on the set of goal parameters and a route alteration to preserve a reserve SOC for return to a charging location.

10. An electrified vehicle with adaptive prediction of electrified vehicle performance comprising:
one or more sensors;
one or more batteries;
one or more motors coupled to receive energy from the batteries;
a plurality of wheels coupled to the one or more motors; and
a processor coupled to provide instructions for charging and discharging the one or more batteries;
a memory that stores instructions coupled to the processor, wherein the processor executes the instructions to:
receive a set of goal parameters identifying a drivers performance requirements, the set of goal parameters comprising a route and a number of laps to be completed for a predetermined charge sequence, wherein the set of goal parameters mandate the number of laps to be completed, and the route comprises a first sub-route to a first charging location after completion of the course;
receive a set of fixed parameters related to vehicle and passenger status;
receive past energy consumption data for the electrified vehicle and the driver; and
generate an adaptive prediction of a future state of charge (SOC) of one or more electricity sources based on the set of goal parameters, the set of fixed parameters and the past energy consumption data, the adaptive prediction including updated parameters based on performance of the electrified vehicle, wherein the generation of the adaptive prediction is to at least:
determine a dynamic course alteration that includes altering the route to take a second sub-route to a second charging location after completion of the course, wherein the second sub-route requires a lesser SOC reserve than the first sub-route;
determine, based at least in part on data collected on the course by the one or more sensors and further based at least in part on the dynamic course alteration, that the current performance of the electrified vehicle is insufficient to meet the set of goal parameters;
in response to having determined that the current performance of the electrified vehicle is insufficient to meet the set of goal parameters, determine a preliminary derating that is sufficient to complete the route and the number of laps, wherein the determining of the preliminary derating is based on one or more of route characteristics, consumption efficiency, battery temperature and the set of goal parameters; and
recommend the preliminary derating to the driver; and
provide a dynamic control alteration based on the adaptive prediction, the dynamic control alteration as a function of the set of goal parameters.

11. The electrified vehicle of claim 10 wherein the set of goal parameters identifying a drivers performance requirements comprises:
a minimum range for of the electrified vehicle at completion of the electrified vehicle performance;
a map identifying the electrified vehicle performance, the map including entrances and exits.

12. The electrified vehicle of claim 10 wherein the set of fixed parameters related to vehicle and passenger status includes one or more of a weight associated with one or more electrified vehicle passengers, a weight of the electrified vehicle, specifications of one or more batteries in the electrified vehicle, specifications for a motor of the electrified vehicle, and one or more characteristics of tires of the electrified vehicle.

13. The electrified vehicle of claim 10 wherein the past energy consumption data for the electrified vehicle and the driver includes initial energy consumption estimates of one or more prior electrified vehicle performances based on one or more of vehicle to vehicle communicated data and vehicle to infrastructure communicated data, and global positioning system (GPS) collected data.

14. The electrified vehicle of claim 13 wherein the one or more prior electrified vehicle performances include one or more of racing laps, test laps, and off-road performances.

15. The electrified vehicle of claim 10 wherein the adaptive prediction of the future SOC of the electricity sources based on the set of goal parameters, the set of fixed parameters and the past energy consumption data, the adaptive prediction including updated parameters based on performance of the electrified vehicle further includes a display of one or more of:
 a state of the one or more electrified vehicle batteries;
 a timer illustrating a discharge of the one or more electrified vehicle batteries;
 a position of the electrified vehicle relative to one or more maps; and
 an adaptive prediction of depletion as modified by the monitored position and the monitored state of the one or more electrified vehicle batteries.

16. The electrified vehicle of claim 10 wherein the adaptive prediction of the future SOC of the electricity sources includes recommending an adaptive control efficiency alteration to reduce an energy consumption of the electrified vehicle including one or more of an efficient trajectory, a reduction in a number of motors; an efficiency based on capacity of regenerative energy sources, and a preliminary de-rating calculation.

17. The electrified vehicle of claim 10 further comprising:
 a display configured to provide a recommended alteration in course based on the adaptive prediction, the recommendation including one or more of a choice of charging location based on the set of goal parameters, a route alteration to preserve a reserve SOC for return to the choice of charging location.

18. A system for adaptive prediction of electrified vehicle performance, comprising
 a memory that stores computer-executable instructions; and
 a processor configured to access the memory and execute the computer-executable instructions to:
 receive a set of goal parameters identifying a drivers performance requirements, the set of goal parameters comprising a route and a number of laps to be completed for a predetermined charge sequence, wherein the set of goal parameters mandate the number of laps to be completed, and the route comprises a first sub-route to a first charging location after completion of the course;
 receive a set of fixed parameters related to vehicle and passenger status;
 receive past energy consumption data for the electrified vehicle and the driver;
 generate an adaptive prediction of a future state of charge (SOC) of one or more electricity sources based on the set of goal parameters, the set of fixed parameters and the past energy consumption data, the adaptive prediction including updated parameters based on performance of the electrified vehicle, wherein the generation of the adaptive prediction is to at least:
  determine a dynamic course alteration that includes altering the route to take a second sub-route to a second charging location after completion of the course, wherein the second sub-route requires a lesser SOC reserve than the first sub-route;
  determine, based at least in part on data collected on the course by one or more sensors of the electrified vehicle and further based at least in part on the dynamic course alteration, that the current performance of the electrified vehicle is insufficient to meet the set of goal parameters;
  in response to having determined that the current performance of the electrified vehicle is insufficient to meet the set of goal parameters, determine a preliminary derating that is sufficient to complete the route and the number of laps, wherein the determining of the preliminary derating is based on one or more of route characteristics, consumption efficiency, battery temperature and the set of goal parameters; and
  recommend the preliminary derating to the driver; and
 provide a dynamic control alteration based on the adaptive prediction, the dynamic control alteration as a function of the set of goal parameters.

* * * * *